United States Patent
Houck

(10) Patent No.: US 12,372,702 B2
(45) Date of Patent: Jul. 29, 2025

(54) OPTICAL FILTER WITH OPTICAL CHANNEL

(71) Applicant: VIAVI Solutions Inc., Chandler, AZ (US)

(72) Inventor: William D. Houck, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 101 days.

(21) Appl. No.: 18/341,990

(22) Filed: Jun. 27, 2023

(65) Prior Publication Data

US 2023/0341599 A1 Oct. 26, 2023

Related U.S. Application Data

(63) Continuation of application No. 17/302,810, filed on May 12, 2021, now Pat. No. 11,709,300.

(51) Int. Cl.
    *G02B 5/28* (2006.01)
    *G02B 5/08* (2006.01)

(52) U.S. Cl.
    CPC .......... *G02B 5/288* (2013.01); *G02B 5/0825* (2013.01); *G02B 5/0875* (2013.01)

(58) Field of Classification Search
    CPC .... G02B 5/288; G02B 5/0825; G02B 5/0875; G02B 1/00; G02B 1/10; G02B 5/003; G02B 5/08; G02B 5/0808; G02B 5/0816; G02B 5/0833; G02B 5/20; G02B 5/201; G02B 5/207; G02B 5/208; G02B 5/22;
    (Continued)

(56) References Cited

U.S. PATENT DOCUMENTS

| 9,939,587 B2 * | 4/2018 | Han ................. G01J 3/1895 |
| 11,709,300 B2 * | 7/2023 | Houck ............... G02B 5/0825 |
| | | 359/584 |

(Continued)

FOREIGN PATENT DOCUMENTS

WO    WO-2013062795 A1 *  5/2013  ........... G02B 26/023

OTHER PUBLICATIONS

Elkabbash et al., "Fane-resonant Ultrathin Film Optical Coatings," Supplementary Information; Natureresearch, 23 pages, Feb. 4, 2021.

(Continued)

*Primary Examiner* — Arnel C Lavarias
(74) *Attorney, Agent, or Firm* — FOLEY & LARDNER LLP

(57) ABSTRACT

An optical filter includes a plurality of optical channels that each have a Fano resonance characteristic. A first optical channel, of the plurality of optical channels, is configured to pass a first portion of a first set of light beams (that are associated with a first wavelength range) and reflect a second portion of the first set of light beams when the first set of light beams falls incident on a particular surface of the first optical channel. A second optical channel, of the plurality of optical channels, is configured to pass a first portion of a second set of light beams (that are associated with a second wavelength range) and reflect a second portion of the second set of light beams when the second set of light beams falls incident on a particular surface of the second optical channel.

20 Claims, 9 Drawing Sheets

(58) Field of Classification Search
CPC . G02B 5/26; G02B 5/28; G02B 5/281; G02B 5/282; G02B 5/284; G02B 5/285; G02B 5/286
USPC ....... 359/584, 577, 580, 582, 583, 585, 586, 359/588, 589, 590, 885, 890, 892
See application file for complete search history.

(56) References Cited

U.S. PATENT DOCUMENTS

| | | |
|---|---|---|
| 11,858,288 B2 * | 1/2024 | Houck .................... G02B 5/26 |
| 2017/0276848 A1 | 9/2017 | Sinclair et al. |
| 2021/0172791 A1 | 6/2021 | Le et al. |
| 2022/0308264 A1 | 9/2022 | Elkabbash et al. |
| 2022/0365263 A1 | 11/2022 | Houck |

OTHER PUBLICATIONS

Elkabbash et al.,"Fane-resonant Ultrathin Film Optical Coatings," Nature Nanotechnology, Springer Nature, 11 pages, Feb. 4, 2021.
Limonov et al., "Fano Resonances in Photonics," Nature Photonics, Macmillan Publishers Limited, Springer nature, 2017, vol. 11, pp. 543-554.

* cited by examiner

OPTICAL FILTER WITH OPTICAL CHANNEL

RELATED APPLICATION

This application is a continuation of U.S. patent application Ser. No. 17/302,810, filed May 12, 2021, which is incorporated herein by reference in its entirety.

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths. The array of sensor elements may be associated with an optical filter. The optical filter may include a passband associated with a first wavelength range of light that is passed to the array of sensor elements. The optical filter may be associated with blocking a second wavelength range of light from being passed to the array of sensor elements.

SUMMARY

In some implementations, an optical filter includes a plurality of optical channels that includes a first optical channel and a second optical channel, wherein: each optical channel, of the plurality of optical channels, has a Fano resonance characteristic; a number of optical channels, of the plurality of optical channels, is greater than or equal to five optical channels; the first optical channel is configured to: receive a first set of light beams associated with a first wavelength range and a second set of light beams associated with a second wavelength range, pass a first portion of the first set of light beams when the first set of light beams falls incident on at least one of a first surface or a second surface of the first optical channel, reflect a second portion of the first set of light beams when the first set of light beams falls incident on the first surface of the first optical channel, and reflect at least a portion of the second set of light beams when the second set of light beams falls incident on the second surface of the first optical channel; and the second optical channel is configured to: receive a third set of light beams associated with a third wavelength range and a fourth set of light beams associated with a fourth wavelength range, pass a first portion of the third set of light beams when the third set of light beams falls incident on at least one of a first surface or a second surface of the second optical channel, reflect a second portion of the third set of light beams when the third set of light beams falls incident on the first surface of the second optical channel, and reflect at least a portion of the fourth set of light beams when the fourth set of light beams falls incident on the second surface of the first optical channel.

In some implementations, an optical filter includes a plurality of optical channels that includes a first optical channel and a second optical channel, wherein: each optical channel, of the plurality of optical channels, has a Fano resonance characteristic; a number of optical channels, of the plurality of optical channels, is greater than or equal to a threshold number of optical channels; a first optical channel, of the plurality of optical channels, includes a first mirror and a first absorber layer disposed on the first mirror; and a second optical channel, of the plurality of optical channels, includes a second mirror and a second absorber layer disposed on the second mirror, wherein: the first optical channel is configured to: pass a first portion of a first set of light beams when the first set of light beams falls incident on a particular surface of the first optical channel, wherein the first set of light beams is associated with a first wavelength range, and reflect a second portion of the first set of light beams when the first set of light beams falls incident on the particular surface of the first optical channel; and the second optical channel is configured to: pass a first portion of a second set of light beams when the second set of light beams falls incident on a particular surface of the second optical channel, wherein the second set of light beams is associated with a second wavelength range, and reflect a second portion of the second set of light beams when the second set of light beams falls incident on the particular surface of the second optical channel.

In some implementations, an optical filter includes a plurality of optical channels that includes a first optical channel and a second optical channel, wherein: each optical channel, of the plurality of optical channels, has a Fano resonance characteristic; a number of optical channels, of the plurality of optical channels, is greater than or equal to a threshold number of optical channels; the first optical channel is configured to: pass a first portion of a first set of light beams when the first set of light beams falls incident on a first surface of the first optical channel, wherein the first set of light beams is associated with a first wavelength range, and reflect a second portion of the first set of light beams when the first set of light beams falls incident on the first surface of the first optical channel; and the second optical channel is configured to: pass a first portion of a second set of light beams when the second set of light beams falls incident on a first surface of the second optical channel, wherein the second set of light beams is associated with a second wavelength range, and reflect a second portion of the second set of light beams when the second set of light beams falls incident on the first surface of the second optical channel.

DETAILED DESCRIPTION

Figure 1A:
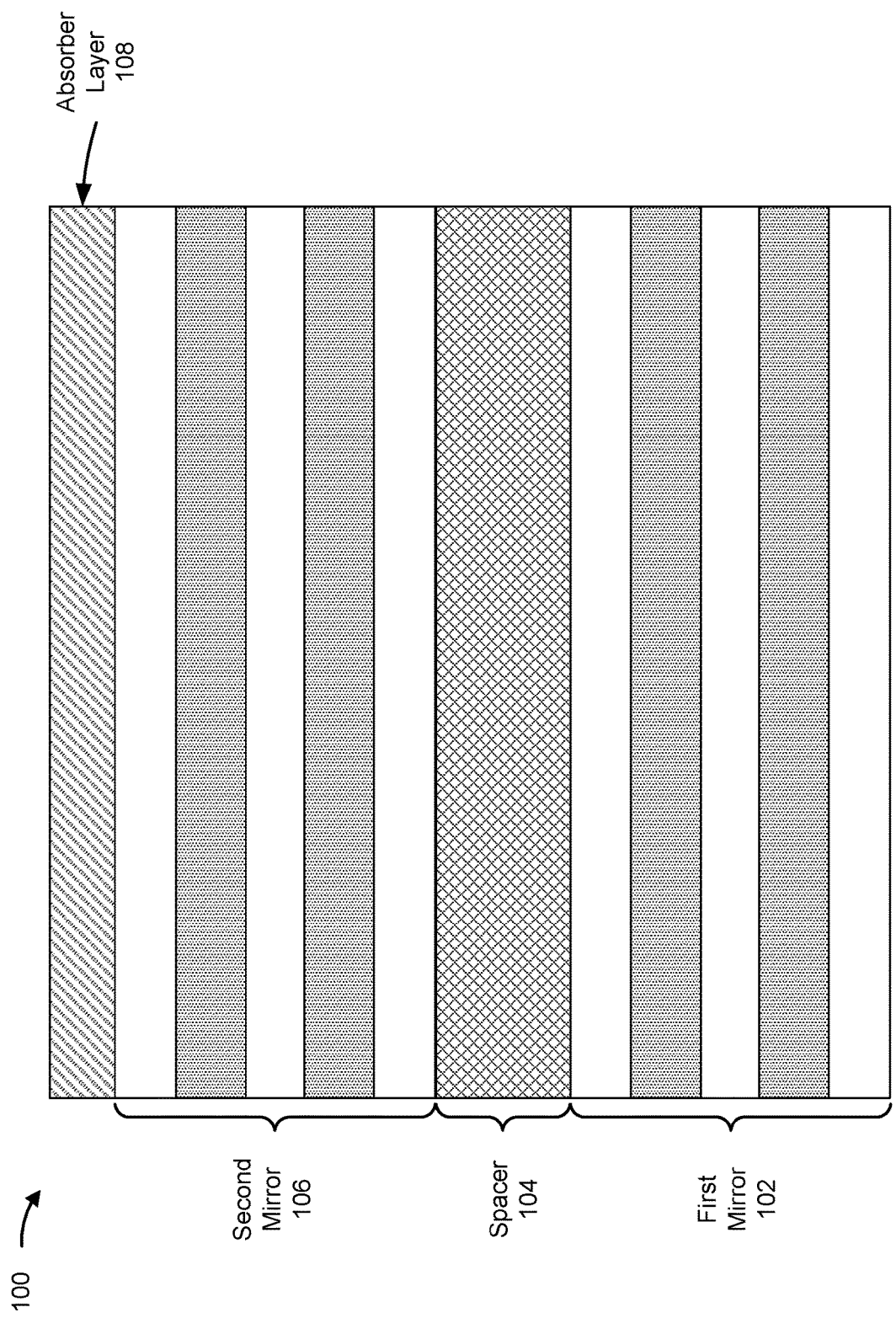
FIGS. 1A-1B are diagrams of example configurations of an optical channel described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A conventional optical sensor device, such as a spectrometer, may be configured to determine spectral information associated with light (e.g., ambient light) captured by the optical sensor device. The light may enter the optical sensor device and may be received by an optical filter and an optical sensor of the optical sensor device (e.g., wherein the optical filter is disposed on the optical sensor). The optical filter may include a set of optical channels designed to respectively pass light in different wavelength ranges to a set of sensor elements of the optical sensor. This allows the optical sensor to determine spectral information associated with the light that relates to the different wavelength ranges.

In some cases, the conventional optical sensor device may include a beam splitter to cause light associated with a particular wavelength range to be split (e.g., after the light has passed through a particular optical channel of the optical filter) into two portions. A first portion transmits to at least one sensor element, of the set of sensor elements, and a second portion transmits to another component of the conventional optical sensor device that is configured to sample one or more optical characteristics of the light (e.g., without interfering with transmission of the first portion to the at least one sensor element). However, including the beam splitter in the conventional optical sensor device increases a complexity of the design of the conventional optical sensor device and/or increases a size (e.g., a two-dimensional area or three-dimensional volume) of the conventional optical sensor device, which prevents the conventional optical sensor device from being incorporated into devices (e.g., user devices, such as a mobile phone devices) that require a small form factor.

Some implementations described herein provide an optical filter that includes a plurality of optical channels that have a Fano resonance characteristic. For example, each optical channel, of the plurality of optical channels, may be configured to pass first light beams associated with a particular wavelength range when the first light beams fall incident on a first surface or a second surface (e.g., a top surface or a bottom surface) of the optical channel and to reflect second light beams associated with the particular wavelength range when the second light beams fall incident on the first surface (e.g., the top surface) of the optical channel. In some implementations, the optical channel may be configured to reflect third light beams associated with a different wavelength range when the third light beams fall incident on the second surface (e.g., the bottom surface) of the optical channel.

In this way, the optical filter described herein is able to pass first portions of light associated with particular wavelength ranges and to reflect second portions of the light associated with the particular wavelength ranges. Accordingly, the optical filter provides a single structure that acts as an optical filter and a beam splitter. This reduces a need for a beam splitter in an optical sensor device (e.g., that requires sampling of a portion of light associated with the particular wavelength ranges) and therefore reduces a design complexity of the optical sensor device, as compared to including a separate optical filter and a separate beam splitter. Further, this reduces a size (e.g., a two-dimensional area or three-dimensional volume) of any optical sensor device that includes the optical filter, which allows the optical sensor device to be incorporated into devices (e.g., user devices) that require a small form factor, which may not be possible for a conventional optical sensor device that includes a separate optical filter and a separate beam splitter.

Figure 1B:
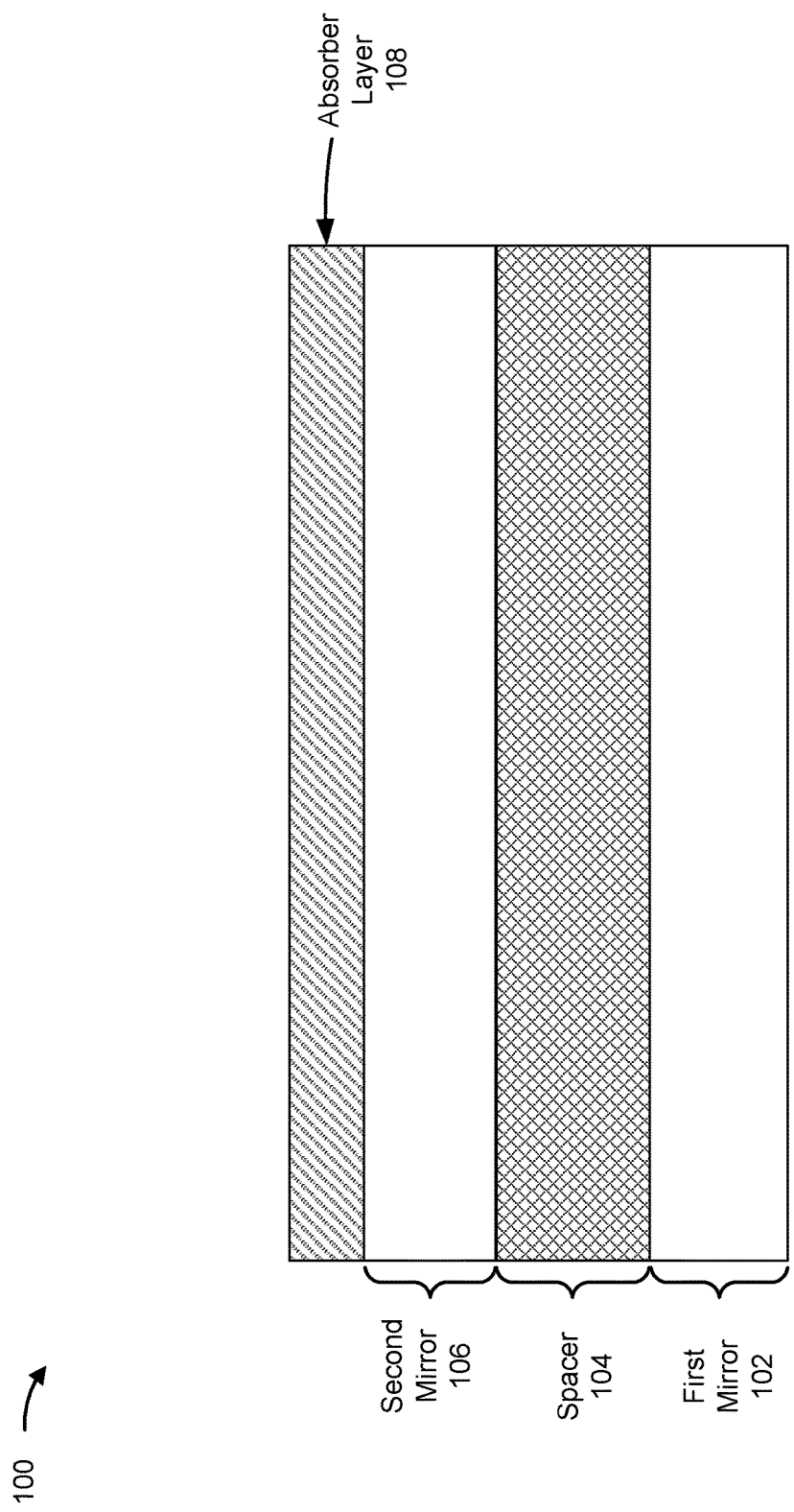

FIGS. 1A-1B are diagrams of example configurations of an optical channel 100 described herein. The optical channel 100 may be included in an optical filter (e.g., optical filter 202 described below in relation to FIGS. 2A-2C). As shown in FIGS. 1A-1B, the optical channel 100 may include a first mirror 102, a spacer 104, a second mirror 106, and/or an absorber layer 108. As shown in FIG. 1A, the first mirror 102 and/or the second mirror 106 may each include a dielectric mirror. For example, the first mirror 102 and/or the second mirror 106 may each include a set of alternating dielectric layers, such as an alternating set of hydrogenated silicon layers and silicon dioxide layers. Alternatively, as shown in FIG. 1B, the first mirror 102 and/or the second mirror 106 may each include a metallic mirror, such as a silver mirror.

As further shown in FIGS. 1A-1B, the spacer 104 may be disposed between the first mirror 102 and the second mirror 106 (e.g., the spacer 104 may disposed on the first mirror 102 and the second mirror 106 may be disposed on the spacer 104). In some implementations, the spacer 104 may comprise one or more spacer layers (e.g., as described in more detail herein in relation to FIGS. 2B-2C). In some implementations, a thickness of the spacer 104 may be configured to provide a particular distance between the first mirror 102 and the second mirror 106 to cause the optical channel 100 to pass light associated with a particular wavelength range (e.g., to pass light that has a wavelength that is greater than or equal to a lower bound of the particular wavelength range and that is less than an upper bound of the particular wavelength range).

As further shown in FIGS. 1A-1B, the absorber layer 108 may be disposed on the second mirror 106 (e.g., a surface of the second mirror 106 that is opposite the surface of the second mirror 106 that is disposed on the spacer 104). For example, as shown in FIGS. 1A-1B, the absorber layer 108 may be disposed on a top surface of the second mirror 106. Accordingly, a surface (e.g., a top surface) of the optical channel 100 may include a surface (e.g., a top surface) of the absorber layer 108.

The absorber layer 108 may include a material comprising germanium, silicon, amorphous silicon, silicon-germanium, a metallic oxide, a telluride, a sulfide, an arsenide, a phosphide, and/or an antimonide, among other examples. In some implementations, a thickness of the absorber layer 108 may be configured to cause a portion of light that falls incident on the absorber layer 108 to be absorbed by the absorber layer 108 and another portion of the light to pass through the absorber layer 108. Additionally, or alternatively, the thickness of the absorber layer 108 may be configured to cause the optical channel 100 to have a Fano resonance characteristic. For example, when light that is associated with a particular wavelength range falls incident on the surface (e.g., the top surface) of the optical channel 100, the absorber layer 108 may have a particular thickness to cause the optical channel 100 to pass a first portion of the light (e.g. through the optical channel 100 from the top surface of the optical channel 100 to a bottom surface of the optical channel 100) and to reflect a second portion of the light (e.g., at the top surface of the of the optical channel 100). In a specific example, when visible light (e.g., red-green-blue (RGB) light) falls incident on the surface (e.g., the top surface) of the optical channel 100, the absorber layer 108 may have a particular thickness to cause the optical channel 100 to pass a first portion of green light included in the visible light (e.g. through the optical channel 100 from the top surface of the optical channel 100 to the bottom surface of the optical channel 100) and to reflect a second portion of the green light included in the visible light (e.g., at the top surface of the of the optical channel 100).

In some implementations, another surface of the optical channel 100 (e.g., that does not include a surface of the absorber layer 108) may reflect light associated with one or more different wavelength ranges (e.g., that do not overlap with the particular wavelength range described above). For example, when broadband light that is associated with the particular wavelength range and the one or more different wavelength ranges falls incident on the other surface (e.g., the bottom surface) of the optical channel 100, the optical channel 100 may pass at least a portion of light associated with the particular wavelength range that is included in the broadband light (e.g. through the optical channel 100 from the bottom surface of the optical channel 100 to the top surface of the optical channel 100) and may reflect at least a portion of light associated with the one or more different wavelength ranges (e.g., at the bottom surface of the optical channel 100). In a specific example, when visible light falls incident on the other surface (e.g., the bottom surface) of the optical channel 100, the optical channel 100 may pass at least a portion of green light included in the visible light (e.g. through the optical channel 100 from the bottom surface of the optical channel 100 to the top surface of the optical channel 100) and may reflect at least a portion of purple light (e.g., a mixture of red light and blue light) included in the visible light (e.g., at the bottom surface of the of the optical channel 100).

As indicated above, FIGS. 1A-1B are provided as examples. Other examples may differ from what is described with regard to FIGS. 1A-1B.

Figure 2A:
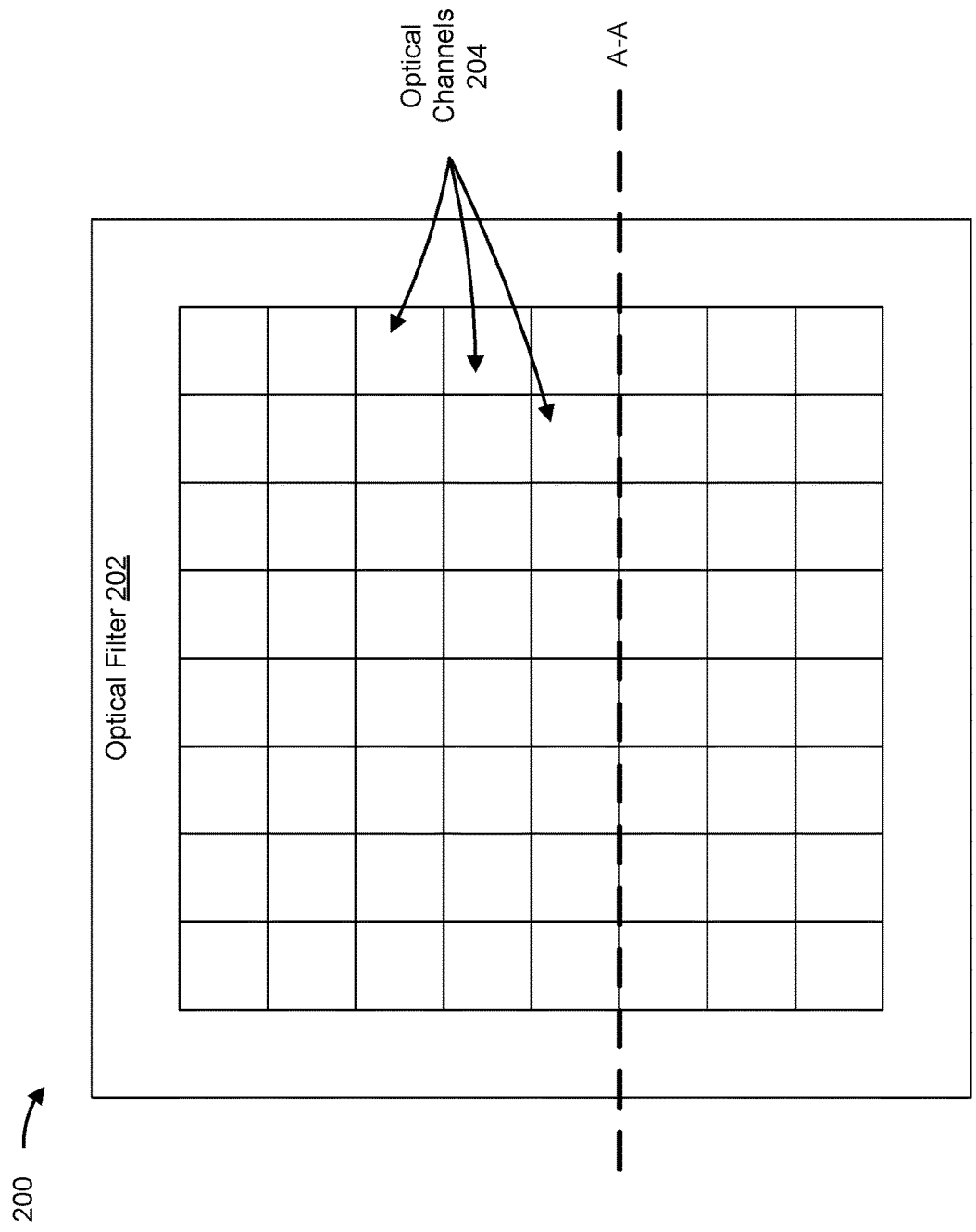
FIGS. 2A-2C are diagrams of an overview of an example implementation described herein.
Figure 2B:
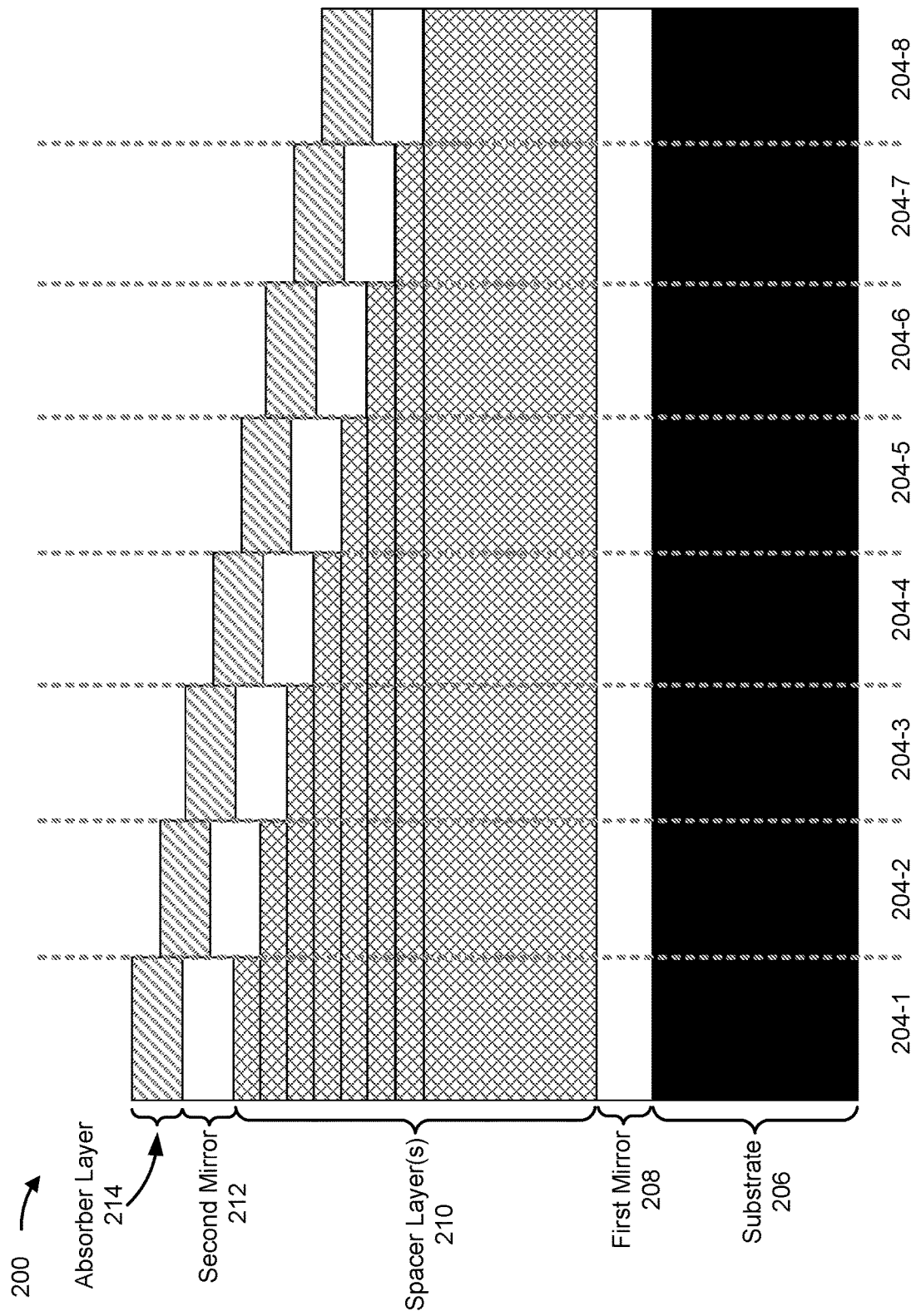
Figure 2C:
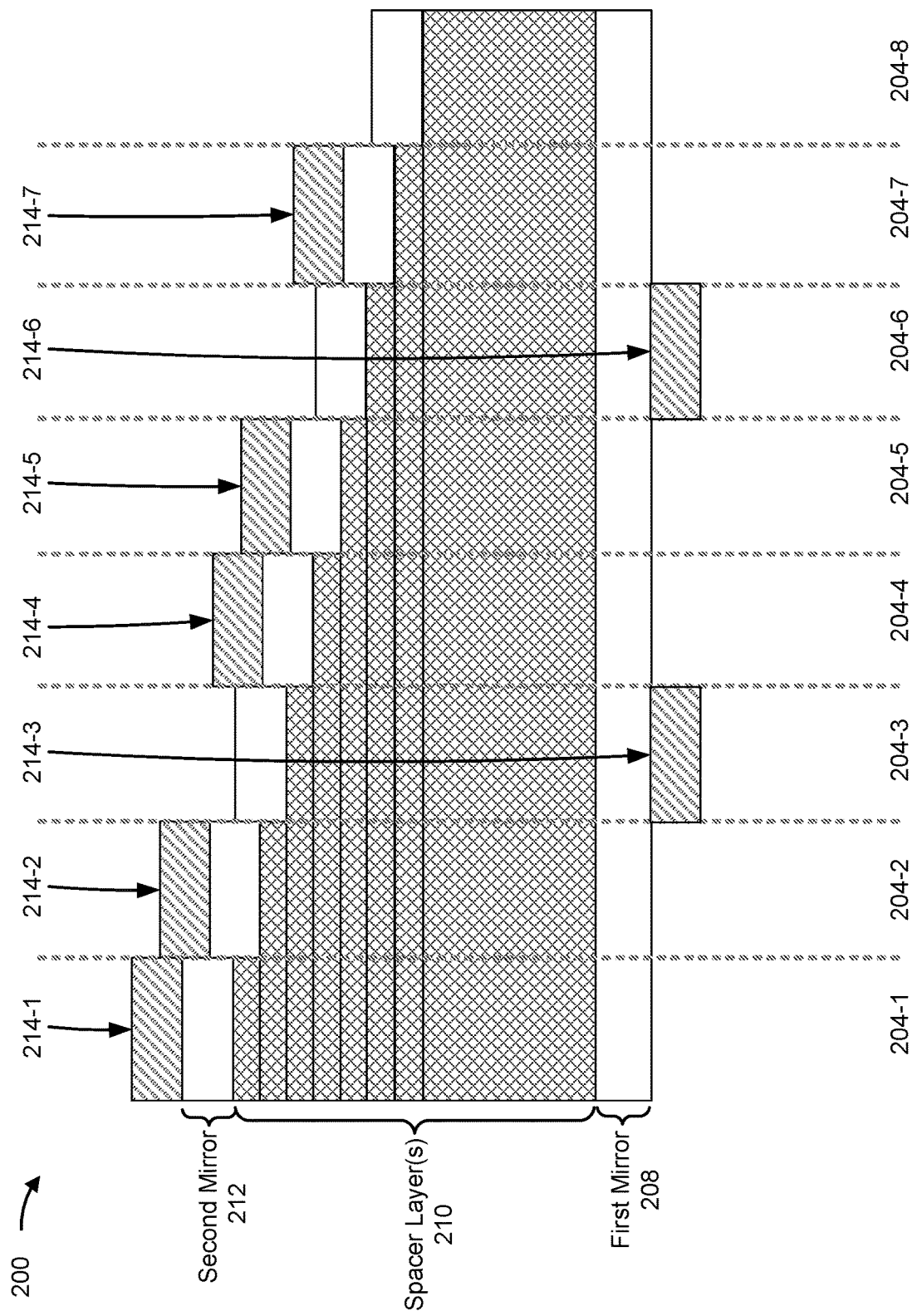

FIGS. 2A-2C are diagrams of an overview of an example implementation 200 described herein. As shown in FIG. 2A, example implementation 200 may include an optical filter 202 that includes a plurality of optical channels 204 (e.g., arranged in a two dimensional array). FIG. 2A shows a top-down view of the optical filter 202. In some implementations, the optical filter 202 may include an optical interference filter (e.g., a thin film optical interference filter), a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, and/or an absorbent filter (e.g., comprising organic dyes, polymers, and/or glasses, among other examples), among other examples. In some implementations, as further described herein, each optical channel 204 has a same or similar configuration as the optical channel 100 described herein in relation to FIGS. 1A-1B.

In some implementations, some or all of the plurality of optical channels 204 may have a Fano resonance characteristic (e.g., as described herein). Further, the number of optical channels 204, of the plurality of optical channels 204, that have a Fano resonance characteristic may be greater than or equal to a threshold number of optical channels. The threshold number may be greater than or equal to, for example, 5, 10, 16, 32, 64, or 128.

FIG. 2B shows an example cross-sectional, side view of the optical filter 202 along the line A-A shown in FIG. 2A. As shown in FIG. 2B, a set of optical channels 204 (shown as optical channels 204-1 through 204-8) may be arranged in a row (or column) adjacent to each other. Each optical channel 204, of the set of optical channels 204, may include a substrate 206 (e.g., a glass substrate, or other light transmissive material, on which other layers described herein are grown, deposited, or otherwise formed), a first mirror 208 (e.g., that is the same as, or similar to, the first mirror 102 described herein in relation to FIGS. 1A-1B), a set of spacer layers 210 (e.g., that is the same as, or similar to, the spacer 104 described herein in relation to FIGS. 1A-1B), a second mirror 212 (e.g., that is the same as, or similar to, the second mirror 106 described herein in relation to FIGS. 1A-1B), and/or an absorber layer 214 (e.g., that is the same as, or similar to, the absorber layer 108 described herein in relation to FIGS. 1A-1B). As further shown in FIG. 2B, the first mirror 208 may be disposed on the substrate 206, the set of spacer layers 210 may be disposed on the first mirror 208, the second mirror 212 may be disposed on the set of spacer layers 210, and/or the absorber layer 214 may be disposed on the second mirror 212. Accordingly a surface of the absorber layer 214 (e.g., a top surface of the absorber layer 214 as shown in FIG. 2B) may be included in a surface of the optical channel 204 (e.g., a top surface of the optical channel 204 as shown in FIG. 2B). The surface of the optical channel 204 (e.g., the top surface of the optical channel 204) may be included in a surface of the optical filter 202 (e.g., a top surface of the optical filter 202).

In some implementations, each optical channel 204, of the set of optical channels 204, may include a different number of spacer layers 210. Accordingly, a thickness of the set of spacer layers 210 for each optical channel 204 may be different, which may cause each optical channel 204 to be configured to pass light associated with a particular wavelength range (e.g., to pass light that has a wavelength that is greater than or equal to a lower bound of the particular wavelength range and that is less than an upper bound of the particular wavelength range). For example, as shown in FIG. 2B, the optical channel 204-1 includes a set of spacer layers 210 that includes eight spacer layers 210, which causes the optical channel 204-1 to pass light associated with a first wavelength range; the optical channel 204-2 includes a set of spacer layers 210 that includes seven spacer layers 210, which causes the optical channel 204-2 to pass light associated with a second wavelength range; the optical channel 204-3 includes a set of spacer layers 210 that includes six spacer layers 210 that causes the optical channel 204-3 to pass light associated with a third wavelength range; and so on.

In some implementations, a thickness of an absorber layer 214 of an optical channel 204, of the set of optical channels 204, may match (e.g., may be the same as or within a thickness tolerance, such as 2 nanometers) a thickness of an absorber layer 214 of at least one other optical channel 204 of the set of optical channels 204. For example, a thickness of the absorber layer 214 of the optical channel 204-1 may match a thickness of the absorber layer 214 of the optical channel 204-2. In some implementations, a thickness of an absorber layer 214 of an optical channel 204 may be associated with a particular wavelength range of light that the optical channel 204 is configured to pass. Accordingly, each absorber layer 214 of the set of optical channels 204 may have a different thickness than that of other optical channels 204 of the set of optical channels 204. For example, a difference between a thickness of an absorber layer 214 of the optical channel 204-3 and a thickness of an absorber layer 214 of the optical channel 204-4 may satisfy (e.g., may be greater than) a thickness difference threshold, such as 2 nanometers.

In some implementations, each optical channel 204, of the set of optical channels 204, may have a Fano resonance characteristic (e.g., due to the absorber layer 214 being disposed on the second mirror 212 and/or a surface of the absorber layer 214 being included in a surface of the optical channel 204). For example, each optical channel 204, of the set of optical channels 204, may be configured to pass first light beams associated with a particular wavelength range when the first light beams fall incident on a first surface or a second surface (e.g., a top surface or a bottom surface) of the optical channel 204, to reflect second light beams associated with the particular wavelength range when the second light beams fall incident on the first surface (e.g., the top surface) of the optical channel 204, and/or to reflect third light beams associated with a different wavelength range when the third light beams fall incident on the second surface (e.g., the bottom surface) of the optical channel 204.

In an additional example, the optical channel 204-1 may be configured to receive (e.g., on a top surface and/or a bottom surface of the optical channel 204-1) broadband light that includes a first set of light beams associated with a first wavelength range and a second set of light beams associated with a second wavelength range. The optical channel 204-1 may be configured to pass a first portion of the first set of light beams (e.g., through the optical channel 204-1) when the first set of light beams falls incident on at least one of the top surface or the bottom surface of the optical channel 204-1, to reflect a second portion of the first set of light beams (e.g., at the top surface of the optical channel 204-1) when the first set of light beams falls incident on the top surface of the optical channel 204-1, and/or to reflect at least a portion of the second set of light beams (e.g., at the bottom surface of the optical channel 204-1) when the second set of light beams falls incident on the bottom surface of the optical channel 204-1. Additionally, or alternatively, the optical channel 204-1 may be configured to prevent the second set of light beams from passing through the optical channel 204-1 (e.g., may be configured to block the second set of light beams) when the second set of light beams falls incident on at least one of the top surface or the bottom surface of the optical channel 204-1.

As another example, the optical channel 204-2 may be configured to receive (e.g., on a top surface and/or a bottom surface of the optical channel 204-2) broadband light that includes a third set of light beams associated with a third wavelength range and a fourth set of light beams associated with a fourth wavelength range. The optical channel 204-2 may be configured to pass a first portion of the third set of light beams (e.g., through the optical channel 204-2) when the third set of light beams falls incident on at least one of the top surface or the bottom surface of the optical channel 204-2, to reflect a second portion of the third set of light beams (e.g., at the top surface of the optical channel 204-2) when the third set of light beams falls incident on the top surface of the optical channel 204-2, and/or to reflect at least a portion of the fourth set of light beams (e.g., at the bottom surface of the optical channel 204-2) when the fourth set of light beams falls incident on the bottom surface of the optical channel 204-2. Additionally, or alternatively, the optical channel 204-2 may be configured to prevent the fourth set of light beams from passing through the optical channel 204-2 (e.g., may be configured to block the fourth set of light beams) when the fourth set of light beams falls incident on at least one of the top surface or the bottom surface of the optical channel 204-2.

FIG. 2C shows another example cross-sectional, side view of the optical filter 202 along the line A-A shown in FIG. 2A. As shown in FIG. 2C, a set of optical channels 204 (shown as optical channels 204-1 through 204-8) may be arranged in a row (or column) adjacent to each other. Each optical channel 204, of the set of optical channels 204, may include a first mirror 208, a set of spacer layers 210, a second mirror 212, and/or an absorber layer 214. As further shown in FIG. 2C, the set of optical channels 204 may include a first subset of optical channels 204 (e.g., that includes optical channels 204-1, 204-2, 204-4, 204-5, and 204-7), a second subset of optical channels 204 (e.g., that includes optical channels 204-3 and 204-6), and/or a third subset of optical channels 204 (e.g., that includes optical channel 204-8).

For an optical channel 204 of the first subset of optical channels 204 (e.g., that includes optical channels 204-1, 204-2, 204-4, 204-5, and 204-7), the set of spacer layers 210 may be disposed on the first mirror 208, the second mirror 212 may be disposed on the set of spacer layers 210, and/or the absorber layer 214 (e.g., absorber layer 214-1, 214-2, 214-4, 214-5, or 214-7) may be disposed on the second mirror 212 (e.g., in a similar manner as that described above in relation to FIG. 2B). Accordingly a surface of the absorber layer 214 (e.g., a top surface of the absorber layer 214 as shown in FIG. 2C) may be included in a first surface of the optical channel 204 (e.g., a top surface of the optical channel 204 as shown in FIG. 2C), and the first surface of the optical channel 204 (e.g., the top surface of the optical channel 204) may be included in a first surface of the optical filter 202 (e.g., a top surface of the optical filter 202).

In this way, each optical channel 204, of the first subset of optical channels 204, may have a Fano resonance characteristic (e.g., due to the absorber layer 214 being disposed on the second mirror 212 and/or the surface of the absorber layer 214 being included in the first surface of the optical channel 204). For example, each optical channel 204, of the first subset of optical channels 204, may be configured to pass first light beams associated with a particular wavelength range when the first light beams fall incident on the first surface or the second surface (e.g., a top surface or a bottom surface) of the optical channel 204, to reflect second light beams associated with the particular wavelength range when the second light beams fall incident on the first surface (e.g., the top surface) of the optical channel 204, and/or to reflect third light beams associated with a different wavelength range when the third light beams fall incident on the second surface (e.g., the bottom surface) of the optical channel 204.

For an optical channel 204 of the second subset of optical channels 204 (e.g., that includes optical channels 204-3 and 204-6), the first mirror 208 may be disposed on the absorber layer 214 (e.g., absorber layer 214-3 or 214-6), the set of spacer layers 210 may be disposed on the first mirror 208, and/or the second mirror 212 may be disposed on the set of spacer layers 210. In this way, the second subset of optical channels 204 may have a different orientation (e.g., an opposite orientation) than that of the first subset of optical channels 204. Accordingly a surface of the absorber layer 214 (e.g., a bottom surface of the absorber layer 214 as shown in FIG. 2C) may be included in a first surface of the optical channel 204 (e.g., a bottom surface of the optical channel 204 as shown in FIG. 2C), and the first surface of the optical channel 204 (e.g., the bottom surface of the optical channel 204) may be included in a second surface of the optical filter 202 (e.g., the bottom surface of the optical filter 202).

In this way, each optical channel 204, of the second subset of optical channels 204, may have a Fano resonance characteristic (e.g., due to the absorber layer 214 being disposed on the first mirror 208 and/or the surface of the absorber layer 214 being included in the first surface of the optical channel 204). For example, each optical channel 204, of the second subset of optical channels 204, may be configured to pass first light beams associated with a particular wavelength range when the first light beams fall incident on the first surface or the second surface (e.g., a bottom surface or a top surface) of the optical channel 204, to reflect second light beams associated with the particular wavelength range when the second light beams fall incident on the first surface (e.g., the bottom surface) of the optical channel 204, and/or to reflect third light beams associated with a different wavelength range when the third light beams fall incident on the second surface (e.g., the top surface) of the optical channel 204.

For an optical channel 204, of the third subset of optical channels 204 (e.g., that includes optical channel 204-8), the set of spacer layers 210 may be disposed on the first mirror 208, and/or the second mirror 212 may be disposed on the set of spacer layers 210, and the optical channel 204 may not include an absorber layer 214. In this way, each optical channel 204, of the third subset of optical channels 204, may not have a Fano resonance characteristic (e.g., due to an absence of an absorber layer 214). For example, each optical channel 204, of the third subset of optical channels 204, may be configured to pass first light beams associated with a particular wavelength range when the first light beams fall incident on a first surface or a second surface (e.g., a top surface or a bottom surface) of the optical channel 204, to reflect second light beams associated with a different range when the second light beams fall incident on the first surface (e.g., the top surface) of the optical channel 204, and/or to reflect third light beams associated with the different wavelength range when the third light beams fall incident on the second surface (e.g., the bottom surface) of the optical channel 204.

As indicated above, FIGS. 2A-2C are provided as examples. Other examples may differ from what is described with regard to FIGS. 2A-2C.

Figure 3A:
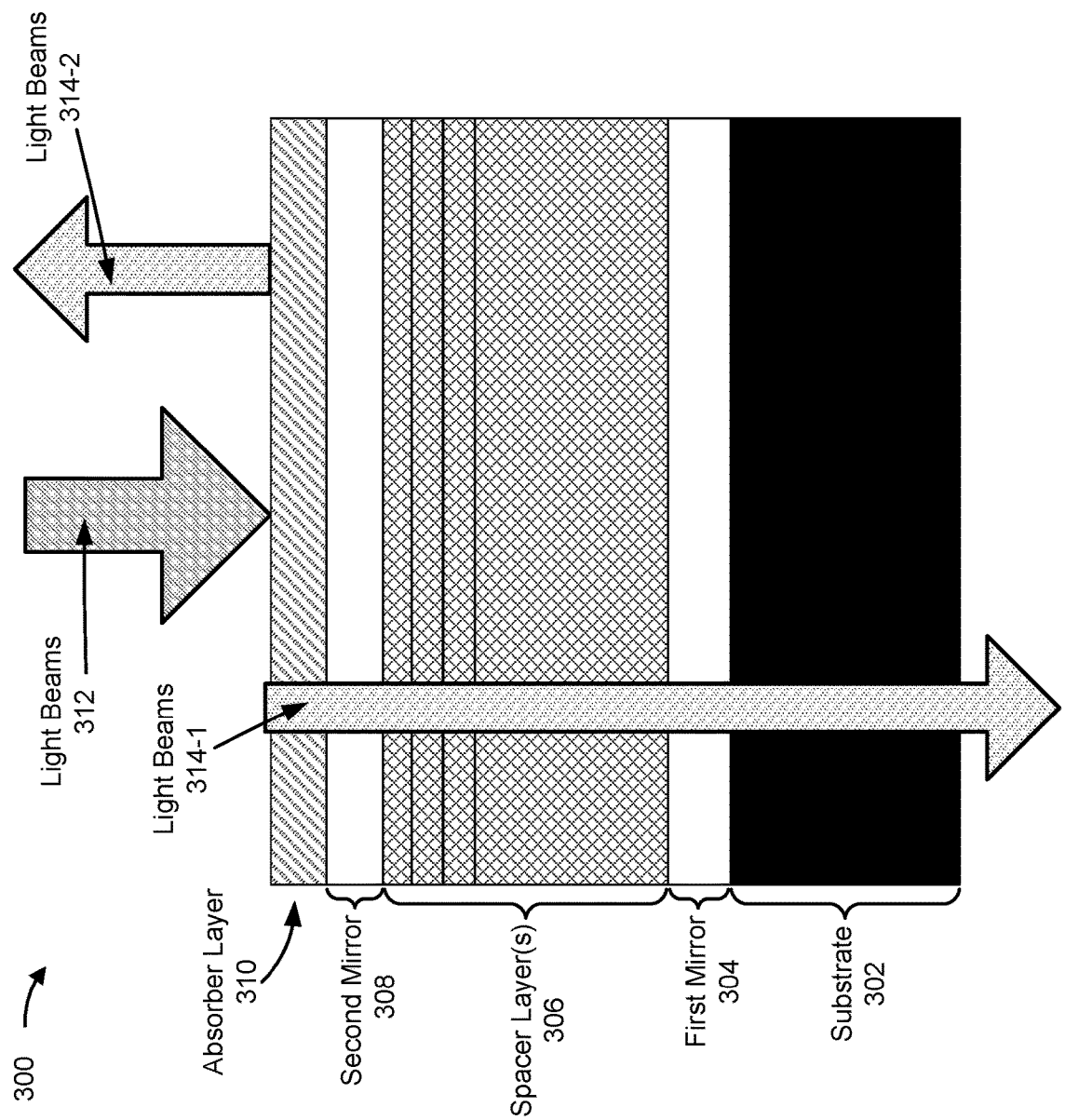
FIGS. 3A-3B are diagrams of an overview of an example implementation related to an optical channel.
Figure 3B:
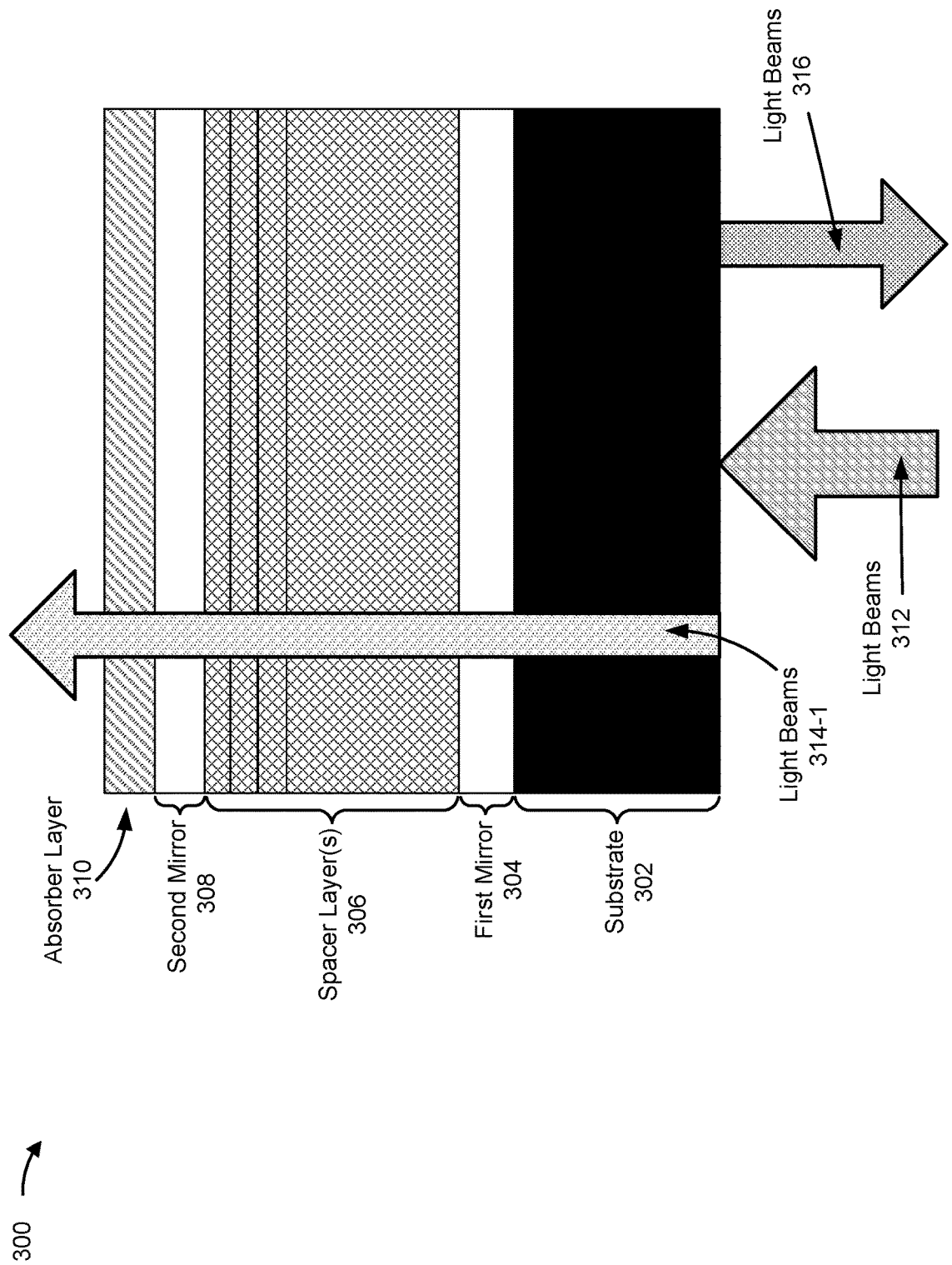

FIGS. 3A-3B are diagrams of an overview of an example implementation related to an optical channel 300 (e.g., that corresponds to an optical channel 100 described herein in relation to FIGS. 1A-1B and/or the optical channel 204 described herein in relation to FIGS. 2A-2C). As shown in FIGS. 3A-3B, the optical channel 300 may include a substrate 302 (e.g., that is the same as, or similar to, the substrate 206 described herein in relation to FIG. 2B), a first mirror 304 (e.g., that is the same as, or similar to, the first mirror 102 described herein in relation to FIGS. 1A-1B and/or the first mirror 208 described herein in relation to FIGS. 2B-2C), a set of spacer layers 306 (e.g., that is the same as, or similar to, the spacer 104 described herein in relation to FIGS. 1A-1B and/or the set of spacer layers 210 described herein in relation to FIGS. 2B-2C), a second mirror 308 (e.g., that is the same as, or similar to, the second mirror 106 described herein in relation to FIGS. 1A-1B and/or the second mirror 212 described herein in relation to FIGS. 2B-2C), and/or an absorber layer 310 (e.g., that is the same as, or similar to, the absorber layer 108 described herein in relation to FIGS. 1A-1B and/or the absorber layer 214 described herein in relation to FIGS. 2B-2C).

As shown in FIG. 3A, a set of broadband light beams 312 may fall incident on a first surface (e.g., a top surface) of the optical channel 300. The set of broadband light beams 312 may include a first set of light beams 314 that are associated with a first wavelength range and a second set of light beams 316 that are associated with a second wavelength range. The optical channel 100 may be configured to pass light associated with the first wavelength range. Accordingly, the optical channel 100 may pass a first portion of the first set of light beams 314-1 through the optical channel 300 from the first surface (e.g., the top surface) to a second surface (e.g., a bottom surface) of the optical channel 300. Further, the optical channel 300 may have a Fano resonance characteristic (e.g., due to the absorber layer 310 being disposed on the second mirror 308 and/or a surface of the absorber layer 310 being included in the first surface of the optical channel 300). Accordingly, the optical channel 300 may reflect (e.g., at the first surface of the optical channel 300) a second portion of the first set of light beams 314-2.

As shown in FIG. 3B, the set of broadband light beams 312 may fall incident on the second surface (e.g., the bottom surface) of the optical channel 300. Accordingly, because the optical channel 100 may be configured to pass light associated with the first wavelength range, the optical channel 100 may pass the first portion of the first set of light beams 314-1 through the optical channel 300 from the second surface (e.g., the bottom surface) to the first surface (e.g., the top surface) of the optical channel 300. Further, because the absorber layer 310 is disposed on the second mirror 308 and not on the first mirror 304 and/or the absorber layer 310 is included in the first surface (e.g., the top surface) of the optical channel 300 and not in the second surface (e.g., the bottom surface) of the optical channel 300, the optical channel 300 may not exhibit the Fano resonance characteristic for light beams that fall incident on the second surface (e.g., the bottom surface) of the optical channel 300. Accordingly, the optical channel 300 may reflect (e.g., at the second surface of the optical channel 300) at least a portion of the second set of light beams 316.

As indicated above, FIGS. 3A-3B are provided as examples. Other examples may differ from what is described with regard to FIGS. 3A-3B.

Figure 4A:
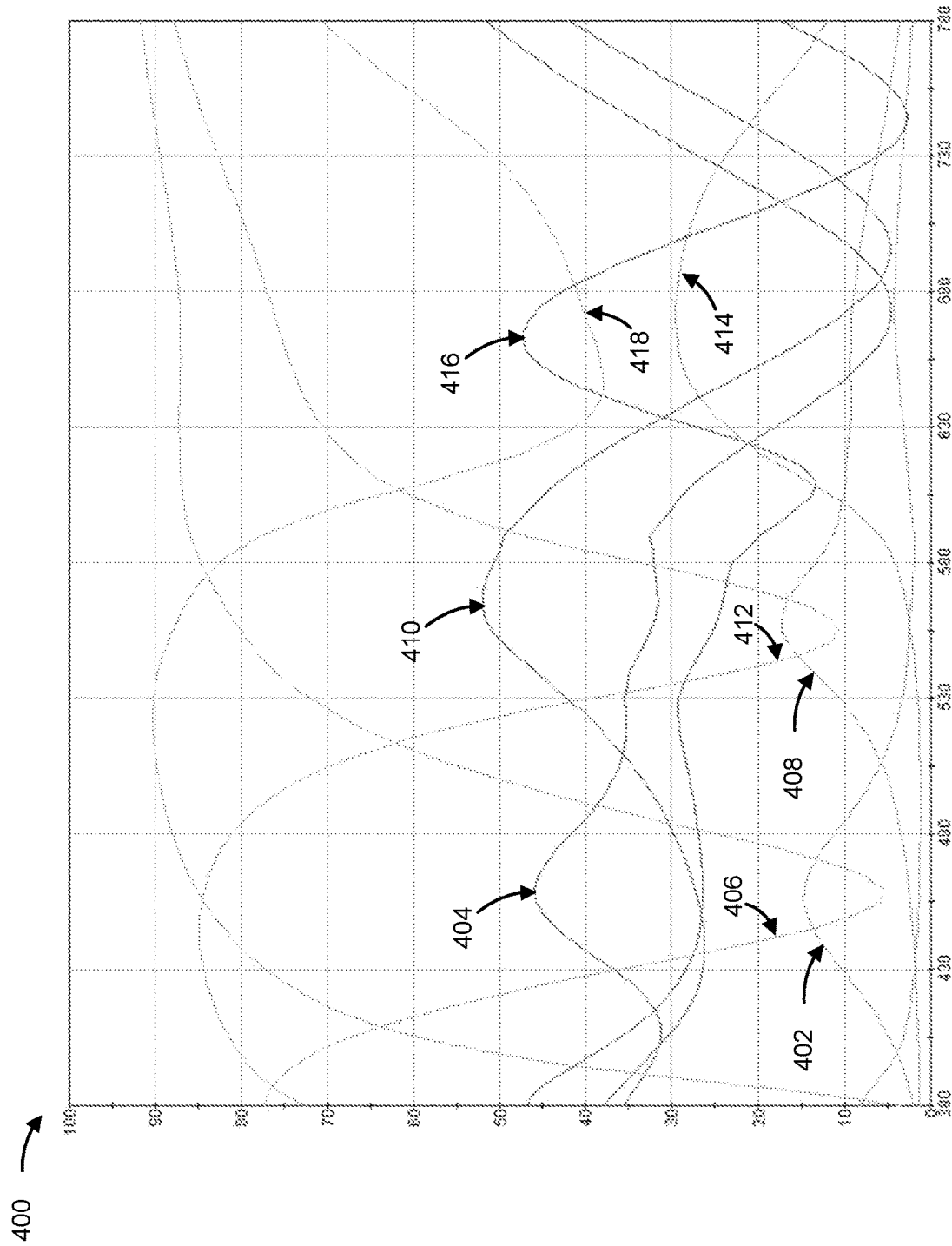
FIGS. 4A-4B are diagrams of optical characteristics related to example implementations described herein.
Figure 4B:
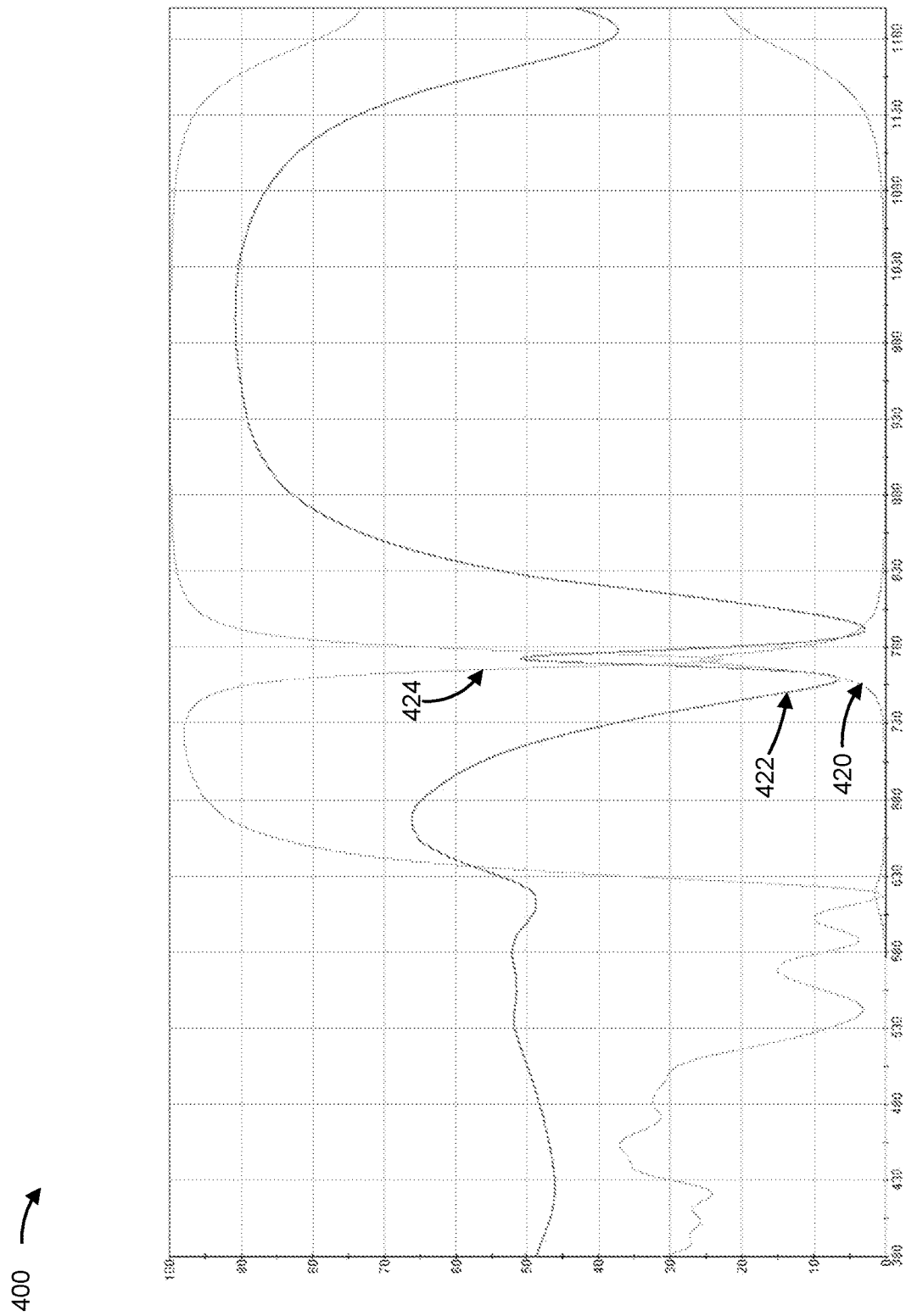

FIGS. 4A-4B are diagrams 400 of optical characteristics related to example implementations described herein. In the example implementations, an optical filter (e.g., that corresponds to the optical filter 202 described herein in relation to FIGS. 2A-2C) may include a plurality of optical channels (e.g., that correspond to the optical channel 100, the optical channel 204, and/or the optical channel 300 described herein in relation to FIGS. 1A-1B, 2A-2C, and 3A-3B). An optical channel, of the plurality of optical channels, may include a first surface and a second surface, where the first surface includes a surface of an absorber layer (e.g., the absorber layer 108, the absorber layer 214, and/or the absorber layer 310 described herein in relation to FIGS. 1A-1B, 2B-2C, and 3A-3B).

FIGS. 4A-4B show a transmittance and reflectance performance of particular optical channels of the plurality of optical channels. For example, as shown in FIG. 4A and by reference number 402, a first optical channel, of the plurality of optical channels, may transmit greater than approximately 10% (with a peak of approximately 15%) of first light associated with a wavelength range between approximately 430 nanometers (nm) and 480 nm that falls incident on a first surface or a second surface of the first optical channel, and, as shown by reference number 404, may reflect greater than approximately 35% (with a peak of approximately 45%) of the first light when the first light falls incident on the first surface of the first optical channel. As shown by reference number 406, the first optical channel may reflect less than 35% (with a bottom of approximately 5%) of the first light when the first light falls incident on the second surface of the first optical channel.

As another example, as shown in FIG. 4A and by reference number 408, a second optical channel, of the plurality of optical channels, may transmit greater than approximately 10% (with a peak of approximately 18%) of second light associated with a wavelength range between approximately 530 nm and 580 nm that falls incident on a first surface or a second surface of the second optical channel, and, as shown by reference number 410, may reflect greater than approximately 42% (with a peak of approximately 52%) of the second light when the second light falls incident on the first surface of the second optical channel. As shown by reference number 412, the second optical channel may reflect less than 40% (with a bottom of approximately 12%) of the second light when the second light falls incident on the second surface of the second optical channel.

In an additional example, as shown in FIG. 4A and by reference number 414, a third optical channel, of the plurality of optical channels, may transmit greater than approximately 22% (with a peak of approximately 29%) of third light associated with a wavelength range between approximately 630 nm and 680 nm that falls incident on a first surface or a second surface of the third optical channel, and, as shown by reference number 416, may reflect greater than approximately 27% (with a peak of approximately 47%) of the third light when the third light falls incident on the first surface of the third optical channel. As shown by reference number 418, the third optical channel may reflect less than 42% (with a bottom of approximately 38%) of the third light when the third light falls incident on the second surface of the third optical channel.

In another example, as shown in FIG. 4B and by reference number 420, a fourth optical channel, of the plurality of optical channels, may transmit greater than approximately 10% (with a peak of approximately 25%) of fourth light associated with a wavelength range between approximately 760 nm and 780 nm that falls incident on a first surface or a second surface of the fourth optical channel, and, as shown by reference number 422, may reflect greater than approximately 10% (with a peak of approximately 51%) of the fourth light when the fourth light falls incident on the first surface of the fourth optical channel. As shown by reference number 424, the fourth optical channel may reflect less than 60% (with a bottom of approximately 23%) of the fourth light when the fourth light falls incident on the second surface (e.g., that does not include an absorber layer) of the fourth optical channel.

As indicated above, FIGS. 4A-4B are provided as examples. Other examples may differ from what is described with regard to FIGS. 4A-4B.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical filter, comprising:
   a plurality of optical channels,
      the plurality of optical channels including:
         a first optical channel configured to:
            pass at least a portion of first light beams associated with a particular wavelength range when the first light beams fall incident on a first surface or a second surface of the first optical channel,
            reflect at least a portion of second light beams associated with the particular wavelength range when the second light beams fall incident on the first surface of the first optical channel, and
            reflect at least a portion of third light beams associated with a different wavelength range when the third light beams fall incident on the second surface of the first optical channel; and
         a second optical channel.

2. The optical filter of claim 1, wherein the first surface of the first optical channel is a top surface of the first optical channel.

3. The optical filter of claim 1, wherein the second surface of the first optical channel is a bottom surface of the first optical channel.

4. The optical filter of claim 1, wherein the first optical channel comprises:
   a first mirror;
   a set of spacer layers disposed on the first mirror;
   a second mirror disposed on the set of spacer layers; and
   an absorber layer disposed on the second mirror,
      wherein the first surface of the first optical channel comprises a surface of the absorber layer.

5. The optical filter of claim 1, wherein:
   the first optical channel comprises a plurality of first layers that includes a first absorber layer,
   the first surface of the first optical channel comprises a surface of the first absorber layer, the second optical channel comprises a plurality of second layers that includes a second absorber layer, and a first surface of the second optical channel comprises a surface of the second absorber layer.

6. The optical filter of claim 1, wherein the first surface of the first optical channel and a first surface of the second optical channel are included in a particular surface of the optical filter.

7. The optical filter of claim 1, wherein:
the first surface of the first optical channel is included in a first surface of the optical filter, and
a first surface of the second optical channel is included in a second surface of the optical filter.

8. An optical filter, comprising:
a plurality of optical channels including:
a first optical channel configured to:
pass at least a portion of first light beams associated with a particular wavelength range when the first light beams fall incident on a first surface or a second surface of the first optical channel, and
reflect at least a portion of second light beams associated with the particular wavelength range when the second light beams fall incident on the first surface of the first optical channel,
wherein the first optical channel comprises a plurality of layers that includes an absorber layer, and
wherein the first surface of the first optical channel comprises a surface of the absorber layer; and
a second optical channel.

9. The optical filter of claim 8, wherein the first optical channel is further configured to:
reflect third light beams associated with a different wavelength range when the third light beams fall incident on the second surface of the first optical channel.

10. The optical filter of claim 8, wherein the first surface of the first optical channel is a top surface of the first optical channel.

11. The optical filter of claim 8, wherein the second surface of the first optical channel is a bottom surface of the first optical channel.

12. The optical filter of claim 8, wherein the plurality of layers further comprises:
a first mirror;
a set of spacer layers disposed on the first mirror; and
a second mirror disposed on the set of spacer layers,
wherein the absorber layer is disposed on the second mirror.

13. The optical filter of claim 8, wherein:
the plurality of layers is a plurality of first layers,
the second optical channel comprises a plurality of second layers that includes a second absorber layer, and
a first surface of the second optical channel comprises a surface of the second absorber layer.

14. The optical filter of claim 8, wherein the first surface of the first optical channel and a first surface of the second optical channel are included in a particular surface of the optical filter.

15. The optical filter of claim 8, wherein:
the first surface of the first optical channel is included in a first surface of the optical filter, and
a first surface of the second optical channel is included in a second surface of the optical filter.

16. An optical filter, comprising:
an optical channel,
the optical channel being configured to:
pass at least a portion of first light beams associated with a particular wavelength range when the first light beams fall incident on a first surface or a second surface of the optical channel,
reflect at least a portion of second light beams associated with the particular wavelength range when the second light beams fall incident on the first surface of the optical channel,
one or more of:
wherein the optical channel is further configured to reflect at least a portion of third light beams associated with a different wavelength range when the third light beams fall incident on the second surface of the optical channel, or
wherein the first surface of the optical channel comprises a surface of an absorber layer of the optical channel.

17. The optical filter of claim 16, wherein the optical channel is further configured to:
reflect at least the portion of the third light beams when the third light beams fall incident on the second surface of the optical channel.

18. The optical filter of claim 16, wherein the first surface of the optical channel is a top surface of the optical channel, and
wherein the second surface of the optical channel is a bottom surface of the optical channel.

19. The optical filter of claim 16,
wherein the first surface of the optical channel comprises the surface of the absorber layer.

20. The optical filter of claim 16, wherein the optical channel has a Fano resonance characteristic.

* * * * *